(12) United States Patent
McArdle et al.

(10) Patent No.: US 6,682,767 B2
(45) Date of Patent: *Jan. 27, 2004

(54) REDUCTION OF HEARTBURN EPISODES UPON INGESTION OF ORANGE JUICE

(75) Inventors: Richard N. McArdle, Bradenton, FL (US); Stephen A. Letourneau, Holmes Beach, FL (US); Carla R. McGill, Sarasota, FL (US); Cindy L. Hart, Myakka City, FL (US); Albert D. Bolles, Bradenton, FL (US)

(73) Assignee: Tropicana Products, Inc., Bradenton, FL (US)

( * ) Notice: Subject to any disclaimer, the term of this patent is extended or adjusted under 35 U.S.C. 154(b) by 266 days.

This patent is subject to a terminal disclaimer.

(21) Appl. No.: 09/848,675

(22) Filed: May 3, 2001

(65) Prior Publication Data

US 2003/0021876 A1 Jan. 30, 2003

(51) Int. Cl.⁷ .............................. A23L 2/04; A61K 35/78
(52) U.S. Cl. ........................ 426/599; 426/74; 424/736
(58) Field of Search ................................. 426/599, 616, 426/74; 424/439, 736

(56) References Cited

U.S. PATENT DOCUMENTS

| | | |
|---|---|---|
| 1,400,191 A | 12/1921 | Wadsworth |
| 2,534,341 A | 12/1950 | Cross |
| 2,631,103 A | 3/1953 | Kermer |
| 2,712,008 A | 6/1955 | Kirchner et al. |
| 2,834,687 A | 5/1958 | Swisher |
| 3,114,641 A | 12/1963 | Sperti |
| 3,657,424 A | 4/1972 | Atkins et al. |
| 3,723,133 A | 3/1973 | Berry et al. |
| 4,439,458 A | 3/1984 | Puri |
| 4,514,427 A | 4/1985 | Mitchell et al. |
| 4,522,836 A | 6/1985 | Dechow et al. |
| 4,551,342 A | 11/1985 | Nakel et al. |
| 4,562,087 A | 12/1985 | Kryger |
| 4,722,847 A | 2/1988 | Heckert |
| 4,738,856 A | 4/1988 | Clark |
| 4,740,380 A | 4/1988 | Melachouris et al. |
| 4,786,510 A | 11/1988 | Nakel et al. |
| 4,830,862 A | 5/1989 | Braun et al. |
| 4,834,990 A | 5/1989 | Amer |
| 4,871,554 A | 10/1989 | Kalala et al. |
| 4,889,739 A | 12/1989 | Powers et al. |
| 4,919,963 A | 4/1990 | Heckert |
| 4,938,985 A | 7/1990 | Swaine, Jr. et al. |
| 4,992,282 A | 2/1991 | Mehansho et al. |
| 4,994,283 A | 2/1991 | Mehansho et al. |
| 5,108,761 A | 4/1992 | Andon et al. |
| 5,118,513 A | 6/1992 | Mehansho et al. |
| 5,186,965 A | 2/1993 | Fox et al. |
| 5,225,221 A | 7/1993 | Camden et al. |
| 5,263,409 A | 11/1993 | van Eikeren et al. |
| 5,389,387 A | 2/1995 | Zuniga et al. |
| 5,401,524 A | 3/1995 | Burkes et al. |
| 5,422,128 A | 6/1995 | Burkes et al. |
| 5,424,082 A | 6/1995 | Dake et al. |
| 5,445,837 A | 8/1995 | Burkes et al. |
| 5,474,704 A | 12/1995 | Zaid |
| 5,474,793 A | 12/1995 | Meyer et al. |
| 5,500,232 A | 3/1996 | Keating |
| 5,516,535 A | 5/1996 | Heckert et al. |
| 5,597,595 A | 1/1997 | DeWille et al. |
| 5,609,897 A | 3/1997 | Chandler et al. |
| 5,665,415 A | 9/1997 | Kligerman et al. |
| 5,762,962 A | 6/1998 | Georgiades et al. |
| 5,780,081 A | 7/1998 | Jacobson et al. |
| 5,834,045 A | 11/1998 | Keating |
| 5,851,578 A | 12/1998 | Gandhi |
| 5,869,119 A | 2/1999 | Kligerman et al. |
| 5,928,691 A | 7/1999 | Reddy et al. |
| 5,989,588 A | 11/1999 | Korn et al. |
| 6,054,168 A | 4/2000 | Lioutas et al. |
| 6,063,411 A | 5/2000 | Jacobson et al. |
| 6,086,927 A | 7/2000 | Frielich et al. |
| 2002/0192309 A1 * | 12/2002 | McArdle et al. ............ 424/736 |

FOREIGN PATENT DOCUMENTS

| | | |
|---|---|---|
| EP | 0 075 114 | 3/1983 |
| EP | 0 357 130 | 3/1990 |
| GB | 2 095 530 A | 10/1982 |
| JP | 54-8767 | 1/1979 |

OTHER PUBLICATIONS

PCT International Search Report for PCT/US02/13352.

Feldman and Cora, "Relationships between the acidity and osmolality of popular beverages and reported postprandial heartburn", *Gastroenterology*, Vol 108, pp. 125–131, 1995. (Abstract).

Mowschenson, et al., "Effect of hyperparathyroidism and hypercalcemia on lower esophageal sphincter pressure", *American Journal of Surgery*, Vol 143, pp. 36–39, Jan. 1982. (Abstract).

R. Lyndon, *Commercialisation of Adsorbertechnology in the Fruit Juice Industry*, Bucher–Alimentech Ltd., Auckland, New Zealand, Apr., 1996.

Varsel, "Citrus Juice Processing as Related to Quality and Nutrition", p. 225–271, *Citrus Nutrition and Quality*, A C S Symposiu Series 143, Nagy & Attaway, Ed., Houston, Texas 1980.

* cited by examiner

*Primary Examiner*—Carolyn Paden
(74) *Attorney, Agent, or Firm*—Cook, Alex, McFarron, Manzo, Cummings & Mehler, Ltd.

(57) ABSTRACT

Reducing heartburn episodes is achieved in individuals having an orange juice intolerance or food allergy. The orange juice product has a low titratable acidity and a low oil condition, which can be combined with addition of a calcium source. Individuals prone to orange juice induced heartburn episodes experience a reduced incidence of heartburn episodes.

39 Claims, 2 Drawing Sheets

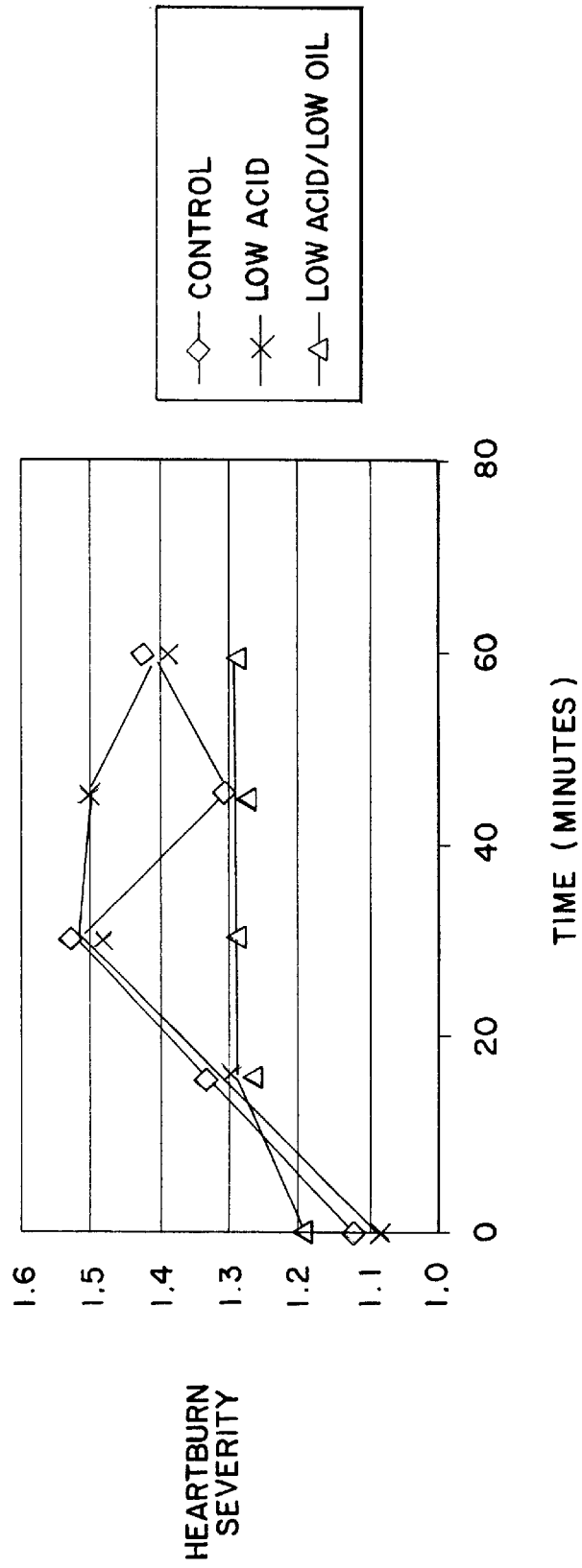

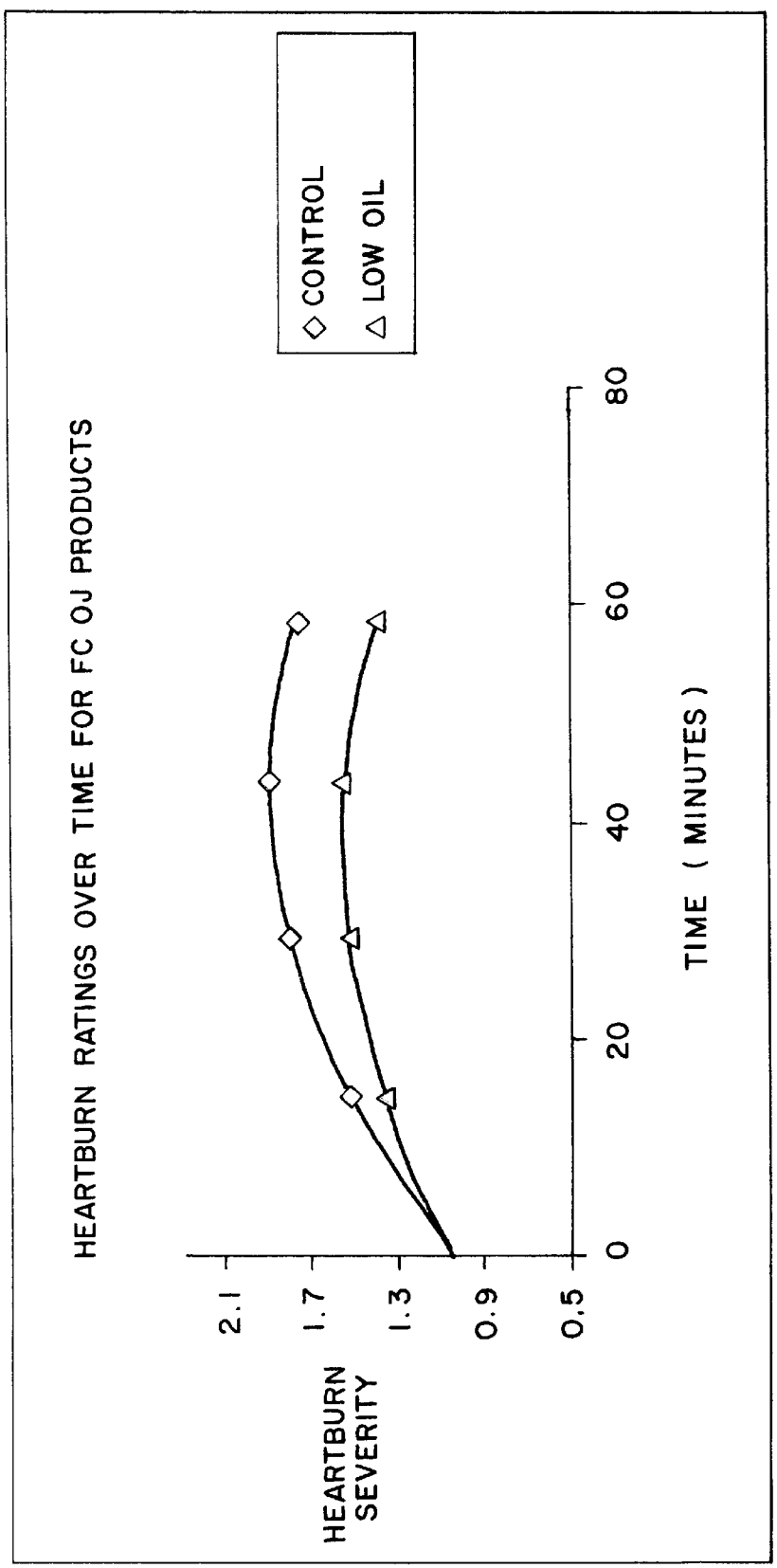

REDUCTION OF HEARTBURN EPISODES UPON INGESTION OF ORANGE JUICE

BACKGROUND OF THE INVENTION

1. Field of Invention

This invention relates to approaches for reducing heartburn episodes when an individual having an orange juice intolerance ingests orange juice according to the invention. The invention is achieved without any substantial negative impact on orange juice flavor or other important attributes. The orange juice is of a lower acid type, has a low-oil condition and can also incorporate a calcium source.

2. Description of Related Art

Numerous individuals have been known to experience negative effects upon ingesting different foods. A true food allergy occurs when the immune system of the individual overreacts to certain proteins in food. It is believed that hundreds of food ingredients can provoke an allergic reaction. Typical foods in this regard are nuts, peanuts, milk, eggs, fish, shellfish, soybeans and wheat. Foods such as these can lead to symptoms including nausea, hives, skin rash, nasal congestion, wheezing, and the like. However, most unpleasant reactions to food are caused not by allergies but by intolerances, which tend to be less severe than true food allergies. Typical in this regard are lactose intolerance, sulfite intolerance and intolerance to monosodium glutamate, red wine, chocolate and food coloring agents. Another intolerance of some frequency is manifested by gastral distress and/or digestive difficulties which certain individuals experience shortly upon ingesting orange juice products.

In some circles, it is generally assumed that the relatively high acidity of orange juice products is a primary contributor to these negative or unpleasant experiences with orange juice products for a small percentage of the population. For example, Kligerman et al U.S. Pat. Nos. 5,665,415 and 5,869,119, incorporated hereinto by reference, suggest that acidic foods or beverages such as coffee and other beverages can be combined with calcium glycerophosphate so as to raise the pH of the food or beverage by at least 0.5 pH units, such as to a pH of greater than 5.4, which typically is a pH higher than desirable for superior tasting orange juice. This pH adjustment is said to reduce the tendency of the food or beverage to cause heartburn and other esophageal and/or gastrointestinal distress. This approach generally follows the conventional wisdom that ingesting antacids treats heartburn by helping to neutralize stomach acid. This approach suggests, in general, raising the pH of the food or beverage to well above 5.

Other approaches have suggested acid reduction for relieving symptoms such as the burning, painful sensation of heartburn. Included is Georgiades et al. U.S. Pat. No. 5,762,962, incorporated hereinto by reference. This patent is directed to antacid pharmaceutical compositions comprising a combination of calcium salts. Another pharmaceutical is found in Korn et al. U.S. Pat. No. 5,989,588 which suggests administering to a patient for preventing heartburn a composition having a pharmaceutically effective amount of an $H_2$ antagonist such as famotidine. These antacid approaches administer tablets in a manner customary for over-the-counter or pharmaceutical antacid administration.

In addition it is well-known that beverages such as orange juice can be supplemented with calcium with the objective of addressing inadequate calcium in the diets of certain individuals, especially in connection with combating osteoporosis. Numerous approaches have been proposed or implemented in this regard. Included is the technology in patents such as Meyer et al U.S. Pat. No. 5,474,793, Camden et al U.S. Pat. No. 5,225,221, and Heckert U.S. Pat. No. 4,722,847, each incorporated hereinto by reference. These take the approach of adding to fruit juices a source of calcium together with a mixture of citric acid and malic acid. A complex solution is formed and combined with the juice.

Other approaches suggest the use of calcium for drink fortification. Keating U.S. Pat. Nos. 5,500,232 and 5,834,045, incorporated hereinto by reference, describe shelf-stable beverages to which are added an acidulant and a source of calcium having calcium hydroxide and calcium glycerophosphate.

These various approaches do not directly address the problem faced by individuals who wish to alleviate discomfort generally falling under the category of heartburn and which can be associated with drinking orange juice. Previous approaches focus on reducing acidity, either within the juice itself, or by administering antacid tablets in an effort to combat acidity within the digestive tract of the individual drinking the orange juice. Approaches heretofore have not satisfactorily arrived at orange juice products themselves which directly address the incidence of heartburn episodes in those individuals who have an orange juice intolerance, insensitivity or allergy. There accordingly is a need for an approach which is more effective than acidity reduction and that is more convenient and self-contained than is the antacid tablet approach.

SUMMARY OF THE INVENTION

In accordance with the present invention, orange juice itself is provided which reduces the incidence of heartburn episodes in individuals having orange juice intolerance. An orange juice supply is modified and/or provided to be a low-acid orange juice supply having a titratable acid content of not greater than about 0.7 weight percent based upon the total weight of the juice product. A procedure is followed which imparts a lower-oil condition to the orange juice product so that the concentration of citrus oil in the orange juice product is less than 0.02 weight percent, based upon the total weight of the orange juice product. Heartburn episodes are reduced for an individual having orange juice intolerance when compared with the incidence of heartburn episodes by that same individual ingesting the orange juice supply which does not include these characteristics. The overall negative impact of oil remaining in the juice can be addressed by including a calcium source in the low-acid orange juice supply so that the calcium concentration within the orange juice product is greater than 0.04 weight percent, based upon the total weight of the orange juice product.

A general object of the present invention is to provide a method and product for reducing the incidence of heartburn episodes in an individual having an orange juice intolerance.

Another object of the present invention is to provide an approach for reducing heartburn episodes by avoiding the episodes, rather than by administering a treatment agent to the individual, by providing an orange juice product which does not antagonize the individual so that heartburn symptoms develop.

Another object of this invention is to provide an improved method and product for safe ingestion of orange juice without experiencing gastrointestinal discomfort.

Another object of the present invention is to provide a modified orange juice supply having a combination of characteristics, including low titratable acidity and low citrus oil, which produce a situation by which heartburn discomfort by orange juice ingestion is lessened.

Other objects and advantages of the present invention will be understood from the following description according to preferred embodiments of the present invention, relevant information concerning which is shown in the accompanying drawings.

BRIEF DESCRIPTION OF THE DRAWINGS

FIG. 1 is a plot of data of heartburn rating over time collected during evaluation of three different formulations of Not From Concentrate (NFC) orange juice.

FIG. 2 is a plot of data of heartburn ratings over time collected during evaluation of certain From Concentrate (FC) orange juice products.

DESCRIPTION OF THE PREFERRED EMBODIMENTS

Orange juice products are provided which have been found to alleviate gastrointestinal distress in individuals which tend to have negative or uncomfortable gastrointestinal experiences upon ingesting orange juice. Such individuals experience post-ingestive symptoms of so-called acid reflux or heartburn. Included in the orange juice products, which are included as an aspect of the invention, is an orange juice supply having low-acid characteristics. The orange juice supply also is further modified in a manner which combines with the low acidity to achieve superior distress relief.

Referring to the low-acid component of the invention, this is expressed in terms of titratable acidity. While the concept of titratable acidity is well-known to those in the art, the preferred test for measuring titratable acidity is the standard method of titration of citric acid with sodium hydroxide.

Although the titratable acidity of orange juice will vary somewhat depending upon the fruit cultivar from which the juice is extracted and the time of the year within the growing season for each cultivar, historically it can be noted that titratable acidity of Not From Concentrate orange juices typically varies between about 0.62 and 0.82. In most instances, normal titratable acidity values are between about 0.65 and 0.8 for a typical orange juice supply before any processing. In accordance with this invention, the finished juice product will have a titratable acidity of not greater than about 0.7 weight percent. Typically, the titratable acidity will be not greater than about 0.6 weight percent. The preferred titratable acidity range is between about 0.5 and about 0.6 weight percent. An especially advantageous target acidity level is about 0.5 weight percent.

In one aspect of the low-acid characteristic of the invention, the orange juice supply is modified (or selected) without carrying out any specific deacidification process. In accordance with this aspect, at least two different approaches can be practiced. In one approach, the fruit going into the extractor is selected so as to provide juice modified to have the desired titratable acidity. In another approach, the juice stream from the extractor is segregated so as to separate the higher acidity flows from lower acidity flows to provide the modified juice. This typically will include monitoring titratable acidity in the flows so as to provide the modifying of an orange juice supply having the titratable acidity needed to achieve the desired low-acid characteristic in the orange juice product. For example, a Not From Concentrate orange juice can be sourced at a desired titratable acidity, such as 0.58, according to this aspect of the low-acid feature.

Another aspect for modifying the orange juice supply to a low-acid orange juice supply is by proceeding with deacidification of an orange juice supply which has a titratable acidity greater than the titratable acidity to be provided. The deacidification of juice products is well-known in the art. A preferred deacidification approach utilizes ion exchange equipment and procedures. Contact between the juice stream and the ion exchange resin basic moieties reduces the acid level and titratable acidity of the juice contacted by the ion exchange resin bed. Any other suitable deacidification approach likewise can be practiced provided the selected technology achieves the desired titratable acidity level.

It is generally preferred that any of these methods for modifying the orange juice supply to a low-acid orange juice supply, whether using deacidification techniques or not, is carried out prior to additional modification of the juice supply. This additional modification according to this invention includes imparting a low-oil condition to the orange juice supply. At times, one also can add a calcium source.

Without wishing to be bound by any particular theory, it is presently believed according to this invention that the citrus oil content of an orange juice product is a primary contributor the distress experienced by those individuals having an orange juice intolerance or food allergy. Low oil characteristics refer to the concentration of citrus oil within the juice product. Citrus oil is generally understood in the art as being the component of citrus juice at a concentration measured by the Scott oil method, which is well-known in the citrus juice art. Typically, the Scott oil method detects and measures the effects of compounds which add bromine across double bonds. Typical citrus oil content is primarily a terpene content which originates to a large extent from citrus peel. A typical major terpene in this regard is d-limonene. This is by far the primary terpene in orange juice.

Citrus oil content within the orange juice product can range from virtually zero percent oil to not greater than about 0.02 volume percent oil, based upon the total volume of the oil juice product. In general, the lower the citrus oil content, the more likely that the reduction of heartburn episodes will be realized. Preferred citrus oil range upper limits are not greater than about 0.018 volume percent oil, more preferably not greater than about 0.016 volume percent oil, most preferably not greater than about 0.012 volume percent oil, all based upon the total volume of the orange juice product. However, a citrus oil concentration above these indicated preferred upper citrus oil levels can experience the heartburn episodes reduction when combined with the calcium source addition aspect of the invention, when desired.

A typical low-oil condition corresponds to a terpene concentration of less than about 100 ppm of terpene in the juice product. Preferably, the terpene level is less than about 80 ppm terpene in the juice product. Most preferably, the terpene content is less than about 60 ppm terpenes in the juice product.

Referring further to adding a calcium source to the low-acid and low-oil orange juice supply, when practiced this step provides a calcium concentration within the orange juice that is greater than 0.04 weight percent, based upon the total weight of the orange juice. The Ca levels are measured by a standard wet chemistry analysis of titration, such as with ethylene diaminetetracetic acid. While not wishing to be bound by any particular mechanism for achieving the objects herein, it is believed that the calcium source addition has at least two advantageous effects.

One effect is that a calcium source such as a calcium citrate source lowers somewhat the titratable acidity. This can be considered as a mechanism which, together with the low-acid modifying approach, combine to achieve the target low titratable acidity which is selected for the product. For example, an orange juice supply which has a borderline or a slightly elevated titratable acidity can be brought within the needed titratable acidity range by a calcium citrate source addition.

Another mechanism which is believed to occur with the addition of a calcium source such as a calcium citrate source can be loosely characterized as assisting in negating the distress-aggravating effects of the citrus oil content of the juice supply. This is believed to be particularly evident when the citrus oil content of the orange juice supply being used is higher than a preferred citrus oil content or is somewhat on the high side of one of the citrus oil content ranges in order to achieve the advantageous results of the invention.

When the calcium source is a calcium citrate source, typically same is provided as a powdered tetrahydrate. Calcium citrate preferably is provided as tricalcium citrate tetrahydrate. Other calcium sources include calcium hydroxide, calcium glycerophosphate and various other calcium sources as noted herein. It will be appreciated that most orange juice sources already have a relatively low quantity of calcium. The concentration of calcium is increased by the calcium source addition such that the concentration of calcium within the orange juice product is greater than 0.04 weight percent and equal to or less than 0.2 weight percent. It will be appreciated that calcium levels within higher portions of this range can produce juice products which are characterized as containing a calcium supplement. It is not the objective of the calcium source addition to add calcium to levels at or in excess of that which a claim for a calcium supplemented juice can be made. Rather, it is contemplated that calcium levels can be at lower levels. Thus, the advantages of the calcium source addition according to this invention typically are achieved without any need to be as high as that needed to provide a juice which can be labeled as a calcium supplemented orange juice.

In fact, it is generally preferred that the calcium source addition be at a level below that at which taste or other sensory parameters will be affected negatively or will otherwise deviate from a chosen norm. Levels above about 0.065 weight percent calcium in the orange juice product tend to exhibit these effects. Accordingly, when these effects are to be avoided, the calcium content should be below about 0.07 weight percent, more comfortably below about 0.06 weight percent. An especially preferred calcium content range for products according to the invention for many juice sources is between above 0.04 weight percent and below 0.05 weight percent.

Addition of the calcium source into the orange juice supply can be carried out by any conventional means of adding a calcium source and which is suitable for industrial-scale operations. Typically, a conventional dry solids mixing system is adequate for a powdered or particulate product. Other systems are known and available for the addition of a liquid type of calcium additive.

A further aspect which can be considered in connection with reduction of heartburn episodes involves the solids content of the juice. A so-called low solids orange juice product is prepared by centrifuging a base of orange juice concentrate and water within a centrifuge in order to remove bottom solids so as to provide an analysis of "zero" solids. This can be accompanied by the addition of citrus oil to a level substantially lower than a natural citrus oil level, but not necessarily within the lower portions of the citrus oil ranges specified herein.

Referring particularly to the method for reducing the incidence of heartburn episodes or other distress experienced by individuals having an orange juice intolerance or allergy, an orange juice supply first is provided. This supply is modified either by selecting an orange juice supply having the low-acid characteristics discussed herein and/or by deacidifying the orange juice supply. A low-acid orange juice supply thus is provided. Imparting the low-oil condition to the orange juice supply is carried out, at times with a calcium source addition as well. A typical orange juice product thus prepared has a pH between about 3.7 and 4.4.

The result is an orange juice product having characteristics which safeguard and/or insulate the individual from heartburn causation so as to reduce the incidence of heartburn episodes. More particularly, the method achieves a reduction in the incidence of heartburn episodes in an individual having difficulties with orange juice ingestion, this reduction being when compared with the incidence of heartburn episodes by that individual ingesting an orange juice supply which does not have the characteristics of the juice described herein.

This method achieves these effects without significantly detrimentally affecting the sensory attributes of the citrus juice. These sensory attributes include taste and especially mouthfeel of the juice. In most instances, the juice products carrying out the method exhibit a mouthfeel and/or taste which is recognized as being smoother than orange juice not having the characteristics disclosed herein.

Studies were undertaken in order to evaluate the heartburn episode reduction of the method aspects of the invention, as reported in the following Examples.

EXAMPLE 1

Three orange juice products of the not-from-concentrate (NFC) type were prepared by formulation as follows. Reported weight percents are rounded to 0.001 percent.

The Control product was a simulated product of 99.9 weight percent of this NFC product and 0.01 weight percent added citrus oil. This and all other weight percent concentrations herein are based upon the total weight of the orange juice product, unless otherwise specified. The titratable acidity of the control was 0.036 weight percent, and the control was analyzed as having 11 mg of Ca per 100 ml of juice (about 0.01 weight percent) and 0.036 volume percent oil, which is a typically normal oil level. This Control was heat pasteurized in accordance with usual industry practices. All of the products of this Example were pasteurized and held refrigerated in bottles until use.

The other two test products were prepared from separate portions of the NFC component of the Control. The test juices were formulated so as to prepare juice products based upon a 100 weight percent formulation.

For example, one of the test products was prepared from the NFC juice component to have a lower acid concentration, such being labeled as a Low Acid NFC juice. This product was formulated from 99.9 weight percent of the NFC juice component, with 0.007 weight percent of a low terpene content oil used to flavor the product, not to adjust its oil level. This product analyzed as having a titratable acidity of 0.53 weight percent, a calcium content of 12.2 mg of Ca per 100 ml of juice (about 0.011 weight percent) and 0.023 volume percent citrus oil.

A further test juice had both a relatively low acid content and low oil content. This test product is identified as the Low Acid/Low Oil NFC orange juice. This product was formulated from 99.9 weight percent of the same NFC juice component of the Low Acid NFC juice, with 0.007 weight percent of the low terpene content oil. This product had a titratable acidity of 0.53 weight percent, 11.3 mg Ca per 100 ml of juice (about 0.01 weight percent), and 0.011 volume percent citrus oil. Each low-acid product was produced from naturally low-acid stored NFC juice. The low oil NFC juice was prepared by deaerating the low acid NFC juice.

Healthy male and female adult volunteer subjects were screened for their ability to perceive digestive difficulties with orange juice. Each recruit participated in four screening sessions. After an overnight fast, each subject was provided with 8 ounces of either orange juice or a placebo beverage (apple juice) in a styrofoam cup having an opaque lid and straw to obscure visual difference. Each subject was requested to rate post-ingestive symptoms over one hour at 15 minute intervals. On three of the four screening occasions, the screening beverage was regular orange juice, and on the other occasion, the placebo was the beverage ingested. Individuals who reported symptoms for two of the three orange juice trials and had no reaction to the placebo were admitted to the study. The study had 14 subjects.

The three NFC juice products of this Example were evaluated in duplicate during ten sessions spread over ten days. The qualified subjects recorded their reactions (self-perceived) to each product when tested by placing a mark on a generic human figure representing the area of discomfort for that subject during that test event. At that time, each subject gave the designated symptom a numerical rating. Ratings were recorded when the subjects first ingested each sample and at 15, 30, 45, and 60 minute intervals.

Table I provides chemical analyses of each of the products which were ingested by the subjects in this study for this invention. Also reported is the Mean Response of heartburn symptoms. This illustrates the severity of heartburn symptoms or episodes of all of the test subjects for each of the three test orange juice products. Means having the same letter are not significantly different at P<0.05, in accordance with a standard least significant differences (LSD) analysis. From these results, the following observation conclusions are reached.

The Low Acid NFC orange juice was statistically the same as the Control, while having a Mean Response value numerically greater than that of the Control. While the only low oil product in this test also was not significantly different from the Control NFC orange juice, its numerical Mean Response was lower. When comparing the Mean Response of the Low Acid NFC orange juice with the Mean Response of the Low Acid/Low Oil NFC orange juice, the later was found to be significantly lower. According to these findings, the Low Acid formulation produced no positive effect in reducing the incidence of heartburn symptom episodes, while combining same with a low oil level achieved a statistically significant reduction in the incidence of heartburn symptoms versus at least the Low Acid product.

TABLE I

|  | Control | Low Acid | Low Acid Low Oil |
|---|---|---|---|
| Brix | 11.7 | 12.8 | 12.5 |
| Acid, % | 0.63 | 0.53 | 0.53 |
| Ratio | 18.54 | 24.11 | 23.55 |
| pH | 3.92 | 4.16 | 4.14 |
| Bottom Solids | 13.0 | 14.0 | 12.0 |

TABLE I-continued

|  | Control | Low Acid | Low Acid Low Oil |
|---|---|---|---|
| Oil, % | 0.036 | 0.023 | 0.011 |
| Calcium, mg/100 mL | 11.0 | 11.2 | 11.3 |
| Mean Response | 1.30 ab | 1.34 a | 1.26 bc |

In order to illustrate the effect on heartburn symptoms for these NFC orange juice products, data in this regard are plotted on FIG. 1. This plot tracks the heartburn rating versus minutes after ingestion. It is noted that all of these plotted NFC juices experience virtually the same heartburn severity at 15 minutes, while the initial severity of heartburn symptoms for the Low Acid/Low Oil NFC orange juice formulation never surpassed the 15 minute heartburn severity level. The Control and the Low Acid products showed a particularly high increase in severity at 30 minutes, and the Low Acid only product did not retreat from this high level to the extent of the Control.

EXAMPLE 2

Three From Concentrate orange juice products were formulated as follows. In these, all weight percents were rounded to 0.01%.

A Control FC orange juice was prepared by combining 17.64 weight percent orange juice concentrate (65 brix) with 82.33 weight percent water and 0.03 weight percent added citrus oil. The Control FC orange juice product was a conventional product produced by diluting no-oil added orange juice concentrate with water (to 12.2 brix) and adding orange oil to a concentration of 0.025 volume percent according to the Scott oil method.

A No Solids FC orange juice was prepared by combining 17.64 weight percent of the concentrate with 82.33 weight percent of water, and this was centrifuged to remove bottom solids until a "0" solids analysis was achieved. Thereafter, citrus oil was added at a level of 0.03 weight percent.

FC orange juice having a very low oil value was prepared. It was labeled Low Oil FC orange juice. This product was made by providing 17.64 weight percent of the same concentrate, 82.35 weight percent water, and 0.004 weight percent of a low citrus oil, which had a very low terpene content (primarily d-limonene) according to a standard Scott oil analysis. This Low Oil FC orange juice was created by diluting the same pumpout concentrate used in making the other products (including the Control) with water and adding orange oil components having very low terpene levels. This produced an orange juice having a profile similar to that of the Control, but having extremely Low Oil analysis (only about 12% of that of the Control).

The clinical trial procedures discussed in accordance with Example 1 were followed. First, screening was conducted as in Example 1. In this study 20 subjects participated. These FC orange juice products were evaluated in duplicate over eight test sessions in random order, the sessions being separated by at least one day. The qualified subjects recorded their reactions in the manner of Example 1.

The relevant chemical parameters and heartburn response ratings at one hour after ingestion of each type of product are reported in Table II. These responses are reported as Mean Response values.

TABLE II

|  | Control | No Solids | Low Oil |
|---|---|---|---|
| Brix | 12.2 | 12.2 | 12.2 |
| Acid, % | 0.66 | 0.66 | 0.67 |
| Ratio | 18.41 | 18.55 | 18.15 |
| pH | 3.90 | 4.01 | 3.88 |
| Bottom Solids | 10.0 | 0.0 | 10.0 |
| Oil, % | 0.025 | 0.016 | 0.003 |
| Calcium, mg/100 mL | 9.0 | 8.9 | 9.1 |
| Vitamin C, mg./100 mL | 49.3 | 41.6 | 50.0 |
| Limonene, ppm | 113 | 67 | 7.6 |
| Mean Response | 1.6 a | 1.5 ab | 1.4 b |

The Mean Response values reported in Table II are at one hour after ingestion. Means having the same letter are not significantly different at α=0.01. A standard LSD analysis was used. These Mean Responses indicate that the Low Oil FC product reported significantly reduced heartburn symptoms relative to the Control FC product, strongly indicating a relationship between citrus oil and/or terpene and heartburn symptoms. Although the solids were removed in the No Solids FC product, about half of the limonine and more than half of the oil remained from the Control, and the full beneficial effect of the Low Oil FC product was not realized. FIG. 2 provides an indication of the consistency of the heartburn severity reduction over the rating time intervals for the Low Oil product versus the Control FC product.

EXAMPLE 3

Four male and female subjects volunteered to evaluate orange juice products. Each subject indicated he or she had a history of digestive problems with orange juice. Five products were tested. Each product began with the same so-called "pump out" concentrate, a concept well known in the art. The particular pump-out concentrate used a very low terpene content according to Scott oil analysis. The brix level for each product was targeted at 12.2 brix, although the product with added calcium analyzed at a higher brix level because calcium adds to the brix level for refractive index reasons.

A Control product was made from 17.64 weight percent of the pump out concentrate (65 brix), 82.33 weight percent water, and 0.03 weight percent citrus oil. Weight percents in this Example were rounded to 0.001 percent. The Control product had a low-acid characteristic (0.5 weight percent titratable acidity), and each of the other products were made from this Control pump-out concentrate and had the same or similar titratable acidity values. This Control had a typical FC oil level of 0.025 volume percent and a typical limonene content of 150 ppm (0.015 weight percent).

Two of these FC orange juice products were prepared to have no citrus flavor oil, and each had non-detectable levels of terpenes. One of these was identified as the No Oil FC orange juice of this Example, having a titratable acidity of 0.5 weight percent and a calcium content of 13 mg Ca per 100 ml of juice product (about 0.012 weight percent). This No Oil product was comprised of 17.64 weight percent of the concentrate of the Control and 82.36 weight percent water.

The other product having non-detectable levels of terpenes was identified as No Oil+Calcium. Calcium glycerophosphate was added. This No Oil+Calcium FC orange juice product had a titratable acidity of 0.51 weight percent, a zero oil content, and 150 mg Ca per 100 ml of juice product (about 0.14 weight percent calcium). This No-Oil+Calcium product was prepared from 17.5 weight percent of the concentrate, 81.68 weight percent water, and 0.82 weight percent calcium glycerophosphate.

Another product was prepared with this same level of added calcium glycerophosphate and had a moderate oil level noticeably lower than that of the control, namely 0.018 volume percent. Its titratable acidity was 0.51 weight percent. This was identified as the Oil+Calcium FC product. The Oil+Calcium product was prepared from 17.49 weight percent of the concentrate, 81.66 weight percent water, 0.03 weight percent added citric oil, and 0.82 weight percent calcium glycerophosphate.

Also prepared was a Low Oil FC formulation which was virtually identical to the Low Oil FC product of Example 2.

Each subject received 6-ounce samples three days a week over an eight-week period. The samples were given to the subjects in opaque cups with lids and an opaque straw so that the products could not be distinguished visually. Subjects were asked not to eat or drink within two hours of the test. After drinking the juice samples, the subjects rated severity of reaction within two hours. A scale of 1 to 5 was used, with 1 signifying a mild reaction and 5 signifying a severe reaction. Each subject recorded the symptoms he or she observed, as well as the nature of the symptoms. Almost all of the reactions were recorded as heartburn symptoms which could be relieved by water, crackers and/or antacids in most instances.

The chemical analysis for each of the Control and the four products are reported in Table III. In addition, the Mean Response of these heartburn symptoms also is reported in this Table III for each product.

TABLE III

|  | Control | No Oil | No Oil + Calcium | Oil + Calcium | Low Oil |
|---|---|---|---|---|---|
| Brix | 12.2 | 12.2 | 12.8 | 12.8 | 12.2 |
| Acid, % | 0.5 | 0.5 | 0.51 | 0.51 | 0.52 |
| Ratio | 24.4 | 24.4 | 25.1 | 25.1 | 23.4 |
| pH | 4.06 | 4.06 | 4.45 | 4.45 | 4.12 |
| Oil, % | 0.025 | 0.0000 | 0.0000 | 0.018 | 0.001 |
| Calcium, mg/100 mL | 13 | 13 | 150 | 150 | 13 |
| Limonene, ppm | 150 | 0 | 0 | 56 | 4 |
| Mean Response | 1.9 a | 1.0 b | 1.1 b | 0.7 b | 0.9 b |

In this study, each of the non-Control FC products were reported as achieving statistically lower heartburn symptoms than the Control. These data indicate that the relatively low acid content of the Control was not by itself adequate to achieve the heartburn symptom control of the other products of this Example which combined the low acidity characteristic with a low oil characteristic. In the case of the Oil+Calcium product, the mean response indicated improvement in heartburn symptoms by a formulation having a moderate oil content and limonene content, illustrating the effectiveness of Calcium in offsetting negative influences of the oil. The No Oil and Calcium product was no more effective than the No Oil product, suggesting redundancy of the added calcium in a formulation with no terpene or other citrus oil.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A method for reducing the incidence of heartburn episodes in an individual having an orange juice intolerance, comprising the steps of:
   providing an initial orange juice supply;
   modifying said initial orange juice supply to a low-acid orange juice supply having a low-acid condition;
   imparting to said orange juice supply a low-oil condition;
   said low-acid condition and said low-oil condition combine to provide an orange juice having heartburn-safeguarding characteristics, said orange juice having heartburn safeguarding characteristics being an orange juice product having:
   (a) a titratable acidity which is not greater than about 0.7 weight percent, based upon the total volume of the orange juice product, and
   (b) a concentration of citrus oil in said orange juice supply which is not greater than 0.012 volume percent, based upon the total volume of the orange juice supply; and
   ingesting said orange juice product having heartburn-safeguarding characteristics by an individual having an orange juice intolerance such that the incidence of heartburn episodes by that individual is reduced over the incidence of heartburn episodes by said individual ingesting said initial orange juice supply and by said individual ingesting the orange juice product which has said low-acid condition but not said low-oil condition.

2. The method of claim 1, further including adding a calcium source to said low-acid orange juice supply in an amount such that the calcium concentration within the orange juice product is greater than 0.04 weight percent, based upon the total weight of the orange juice product.

3. The method of claim 2, wherein after said adding step the calcium concentration of the orange juice product having heartburn-safeguarding characteristics is not greater than about 0.2 weight percent, based upon the total weight of the orange juice.

4. An orange juice product produced in accordance with the method of claim 2, wherein the orange juice product has said heartburn-safeguarding characteristics.

5. The method of claim 1, wherein the low-acid orange juice supply of said adding step has a titratable acidity of not greater than about 0.7 weight percent, based upon the total weight of the orange juice supply.

6. The method of claim 1, wherein the orange juice product having heartburn-safeguarding characteristics of said ingesting step has a titratable acidity of between about 0.5 and about 0.6 weight percent, based upon the total weight of the orange juice supply.

7. The method of claim 1, wherein the low-acid orange juice supply of said adding step has a titratable acidity of between about 0.5 and about 0.6 weight percent, based upon the total weight of the orange juice supply.

8. The method of claim 1, wherein said imparting step imparts the low-oil condition to said initial orange juice supply.

9. The method of claim 1, wherein said imparting step imparts the low-oil condition to said low-acid orange juice supply.

10. The method of claim 1, wherein said imparting step imparts to said initial orange juice supply a low-oil condition at which the concentration of terpene in said orange juice product is less than about 80 ppm of the orange juice product.

11. The method of claim 1, wherein said imparting step imparts to said low-acid orange juice supply a low-oil condition at which the concentration of terpene in said orange juice product is less than about 60 ppm of the orange juice product.

12. The method of claim 1, wherein said modifying step includes reducing the titratable acidity of the initial orange juice supply to provide the low-acid orange juice supply.

13. The method of claim 1, wherein said modifying step includes selecting an orange source to have the low titratable acid content.

14. An orange juice product produced in accordance with the method of claim 1, wherein the orange juice product has said heartburn-safeguarding characteristics.

15. A method for reducing the incidence of heartburn episodes in an individual having an orange juice intolerance, comprising:
   providing an initial orange juice supply;
   modifying said initial orange juice supply to a low-acid orange juice supply having a low-acid condition;
   adding a calcium source to said low-acid orange juice supply, wherein the adding adds a calcium citrate source;
   imparting to said orange juice supply a low-oil condition;
   said low-acid condition, said low-oil condition and said calcium source combine to provide an orange juice having heartburn-safeguarding characteristics, said orange juice having heartburn safeguarding characteristics being an orange juice product having:
   (a) a titratable acidity which is not greater than about 0.7 weight percent, based upon the total volume of the orange juice produce,
   (b) a concentration of citrus oil in said orange juice supply which is not greater than 0.012 volume percent, based upon the total volume of the orange juice supply, and
   (c) a concentration of calcium within the orange juice product is greater than 0.04 weight percent, based upon the total weight of the orange juice product; and
   ingesting said orange juice product having heartburn-safeguarding characteristics by an individual having an orange juice intolerance such that the incidence of heartburn episodes by that individual is reduced over the incidence of heartburn episodes by said individual ingesting said initial orange juice supply.

16. The method of claim 15, wherein the adding adds tricalcium citrate tetrahydrate as the calcium citrate source.

17. The method of claim 16, wherein the tricalcium citrate tetrahydrate is added by said adding step as dry solid particulates.

18. The method of claim 15, wherein the adding adds the calcium citrate source as dry solid particulates into the orange juice supply.

19. A method for reducing the incidence of heartburn episodes in an individual having an orange juice intolerance, comprising the steps of:
   providing an initial orange juice supply;
   modifying said initial orange juice supply to a low-acid orange juice supply having a low titratable acid content;
   imparting to said orange juice supply a low-oil condition;
   adding a calcium source to said low-acid orange juice supply thereby increasing the calcium content of the low-acid orange juice;
   said low-acid condition, said low-oil condition and said calcium content combine to provide an orange juice having heartburn-safeguarding characteristics, said orange juice having heartburn-safeguarding characteristics being an orange juice product having:
(a) a titratable acidity which is not greater than about 0.6 weight percent, based upon the total weight of the orange juice product,
(b) a concentration of citrus oil which is less than 0.02 volume percent, based on the total volume of the orange juice product, and
(c) a calcium concentration which is greater than 0.04 weight percent, based upon the total weight of the orange juice product; and ingesting said orange juice product having heartburn-safeguarding characteristics by an individual having an orange juice intolerance such that the incidence of heartburn episodes by that individual is reduced over the incidence of heartburn episodes by said individual ingesting said initial orange juice supply and by said individual ingesting the orange juice product which has said low-acid condition but not said low-oil condition.

20. The method of claim 19, wherein the low-acid orange juice supply of said adding step has a titratable acidity of not greater than 0.6 weight percent, based upon the total weight of the orange juice supply.

21. The method of claim 19, wherein the orange juice product having heartburn-safeguarding characteristics of said ingesting step has a titratable acidity of between about 0.5 and about 0.6 weight percent, based upon the total weight of the orange juice supply.

22. The method of claim 19, wherein the low-acid orange juice supply of said adding step has a titratable acidity of between about 0.5 and about 0.6 weight percent, based upon the total weight of the orange juice supply.

23. The method of claim 19, wherein after said adding step the calcium concentration of the orange juice product having heartburn-safeguarding characteristics is not greater than about 0.2 weight percent, based upon the total weight of the orange juice.

24. The method of claim 19, wherein said imparting step results in a low-oil condition at which the concentration of terpene in said orange juice product is less than about 80 ppm of the orange juice product.

25. The method of claim 19, wherein said modifying step includes reducing the titratable acidity of the initial orange juice supply to provide the low-acid orange juice supply.

26. The method of claim 19, wherein said modifying step includes selecting an orange source to have the low titratable acid content.

27. An orange juice product produced in accordance with the method of claim 19, wherein the orange juice product has said heartburn-safeguarding characteristics.

28. A method for reducing the incidence of heartburn episodes in an individual having an orange juice intolerance, comprising:
providing an initial orange juice supply;
modifying said initial orange juice supply to a low-acid orange juice supply having a low titratable acid content;
imparting to said orange juice supply a low-oil condition;
adding a calcium citrate calcium source to said low-acid orange juice supply thereby increasing the calcium content of the low-acid orange juice;
said low-acid condition, said low-oil condition and said calcium content combine to provide an orange juice having heartburn-safeguarding characteristics, said orange juice having heartburn-safeguarding characteristics being an orange juice product having:
(a) a titratable acidity which is not greater than about 0.6 weight percent, based upon the total weight of the orange juice product,
(b) a concentration of citrus oil which is less than 0.02 volume percent, based on the total volume of the orange juice product, and
(c) a calcium concentration which is greater than 0.04 weight percent, based upon the total weight of the orange juice product; and ingesting said orange juice product having heartburn-safeguarding characteristics by an individual having an orange juice intolerance such that the incidence of heartburn episodes by that individual is reduced over the incidence of heartburn episodes by said individual ingesting said initial orange juice supply.

29. A method for reducing the incidence of heartburn episodes in an individual having an orange juice intolerance, comprising:
providing an initial orange juice supply;
modifying said initial orange juice supply to a low-acid orange juice supply having a low titratable acid content;
imparting to said orange juice supply a low-oil condition;
adding a calcium source as dry solid particulates into the orange juice supply thereby increasing the calcium content of the low-acid orange juice;
said low-acid condition, said low-oil condition and said calcium content combine to provide an orange juice having heartburn-safeguarding characteristics, said orange juice having heartburn-safeguarding characteristics being an orange juice product having:
(a) a titratable acidity which is not greater than about 0.6 weight percent, based upon the total weight of the orange juice product,
(b) a concentration of citrus oil which is less than 0.02 volume percent, based on the total volume of the orange juice product, and
(c) a calcium concentration which is greater than 0.04 weight percent, based upon the total weight of the orange juice product; and ingesting said orange juice product having heartburn-safeguarding characteristics by an individual having an orange juice intolerance such that the incidence of heartburn episodes by that individual is reduced over the incidence or heartburn episodes by said individual ingesting said initial orange juice supply.

30. An orange juice product having heartburn-safeguarding characteristics when ingested by an individual having an orange juice intolerance, comprising: an orange juice product having a low-acid and a low-oil condition;
said low-acid condition and low-oil condition combine to provide an orange juice having reduced heartburn symptom episodes when compared with the orange juice product which has said low-acid condition but not said low-oil condition, said orange juice product having:
(a) a titratable acidity which is not greater than 0.7 weight percent, based upon the total weight of the orange juice product, and
(b) a concentration of citrus oil in said orange juice supply which is not greater than 0.012 volume percent, based upon the total volume of the orange juice supply; and
(c) heartburn-safeguarding characteristics when ingested by an individual having an orange juice intolerance such that the incidence of heartburn episodes by that individual is reduced over the incidence of heartburn episodes by said individual ingesting another orange juice product having a titratable acidity greater than 0.7 weight percent, based upon the total weight of the orange juice product, and having a concentration of citrus oil which is greater than 0.012 volume percent, based upon the total volume of the orange juice product.

31. The product of claim 30, wherein the orange juice product further includes an added calcium component such that calcium concentration within the orange juice product is greater than 0.04 weight percent, based upon the total weight of the orange juice product.

32. The product of claim 30, wherein the titratable acidity of the orange juice product is between about 0.5 and about 0.6 weight percent, based upon the total weight of the orange juice product.

33. The product of claim 30, wherein said low-oil condition comprises a concentration of terpene in said orange juice product which is less than about 80 ppm of the orange juice product.

34. The product of claim 30, wherein said low-oil condition comprises a concentration of terpene in said orange juice product which is less than about 60 ppm of the orange juice product.

35. An orange juice product having heartburn safeguarding characteristics when ingested by an individual having an orange juice intolerance, comprising: a low-acid and low-oil orange juice product containing a calcium citrate source, the orange juice product having:

(a) a titratable acidity which is not greater than about 0.6 weight percent, based upon the total weight of the orange juice product;

(b) a concentration of citrus oil in said orange juice supply which is less than 0.02 volume percent, based upon the total volume of the orange juice supply;

(c) a calcium citrate component such that the calcium concentration is greater than 0.04 weight percent, based upon the total weight of the orange juice product; and (d) heartburn-safeguarding characteristics when ingested by an individual having an orange juice intolerance such that the incidence of heartburn episodes by said individual ingesting another orange juice product having a titratable acidity greater than about 0.6 weight percent and a citrus oil content greater than 0.02 weight percent, based upon the total weight of the product, and having no said calcium citrate component.

36. The product of claim 35, wherein the orange juice product having heartburn-safeguarding characteristics has a titratable acidity of between about 0.5 and about 0.6 weight percent, based upon the total weight of the orange juice product.

37. The product of claim 35, wherein tricalcium citrate tetrahydrate is the calcium citrate source.

38. The product of claim 35, wherein the calcium concentration of the orange juice product is not greater than about 0.2 weight percent, based upon the total weight of the orange juice product.

39. The product of claim 35, wherein said, low-oil condition is one at which terpene in said orange juice product is at a concentration of less than about 80 ppm of the orange juice product.

* * * * *

UNITED STATES PATENT AND TRADEMARK OFFICE
CERTIFICATE OF CORRECTION

PATENT NO. : 6,682,767 B2
DATED : January 27, 2004
INVENTOR(S) : Richard N. McArdle et al.

It is certified that error appears in the above-identified patent and that said Letters Patent is hereby corrected as shown below:

Title page,
Item [56], References Cited, OTHER PUBLICATIONS, "Varsel," reference, delete "Symposiu" insert -- Symposium --.

Column 4,
Line 23, after "contributor" insert -- to --.

Column 7,
Line 51, delete "later" insert -- latter --.

Column 12,
Line 31, delete "produce" insert -- product --.

Column 14,
Line 43, delete "or" insert -- of --.

Signed and Sealed this

Twelfth Day of October, 2004

JON W. DUDAS
*Director of the United States Patent and Trademark Office*